United States Patent Office 3,237,700
Patented Mar. 1, 1966

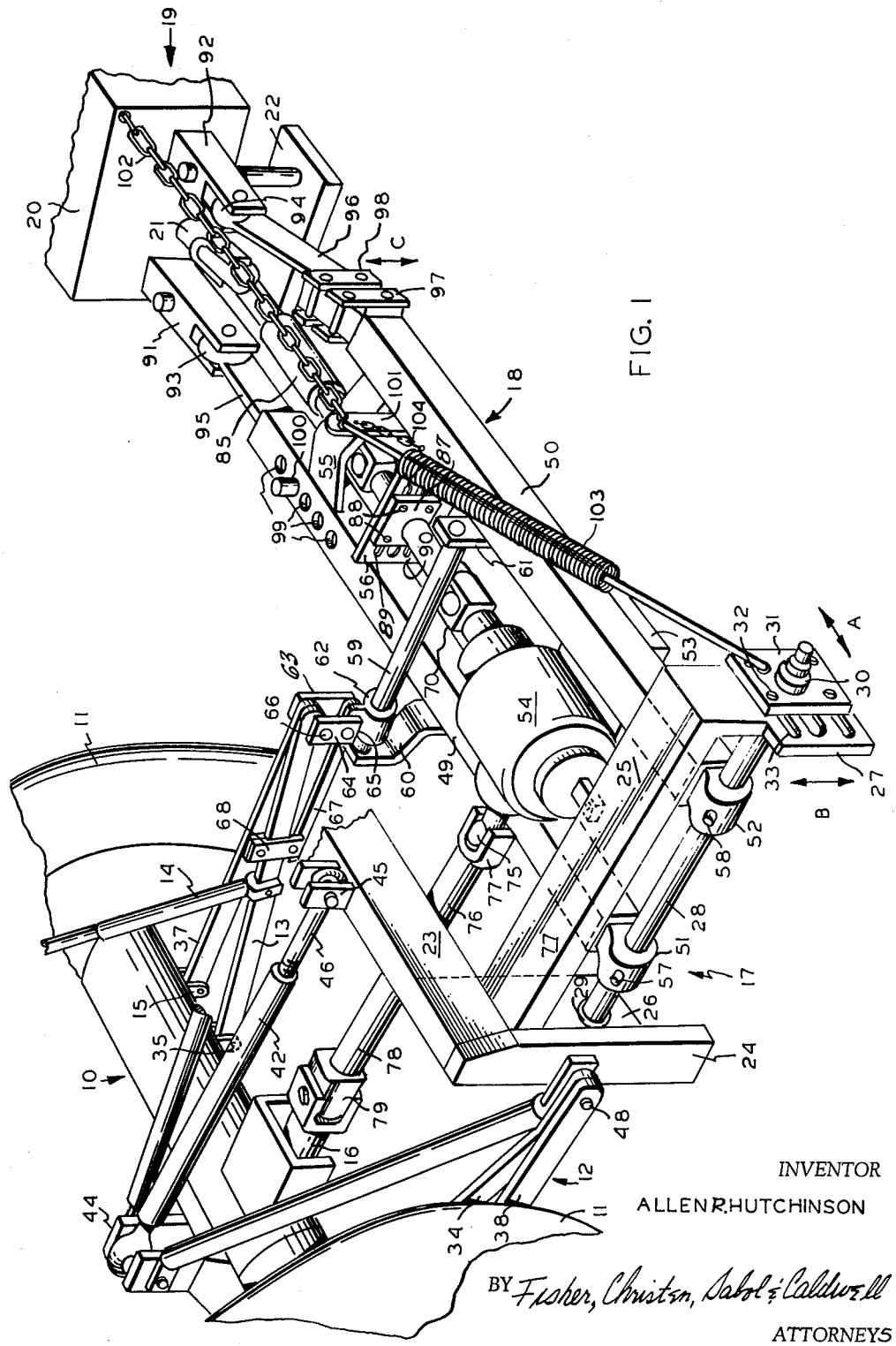

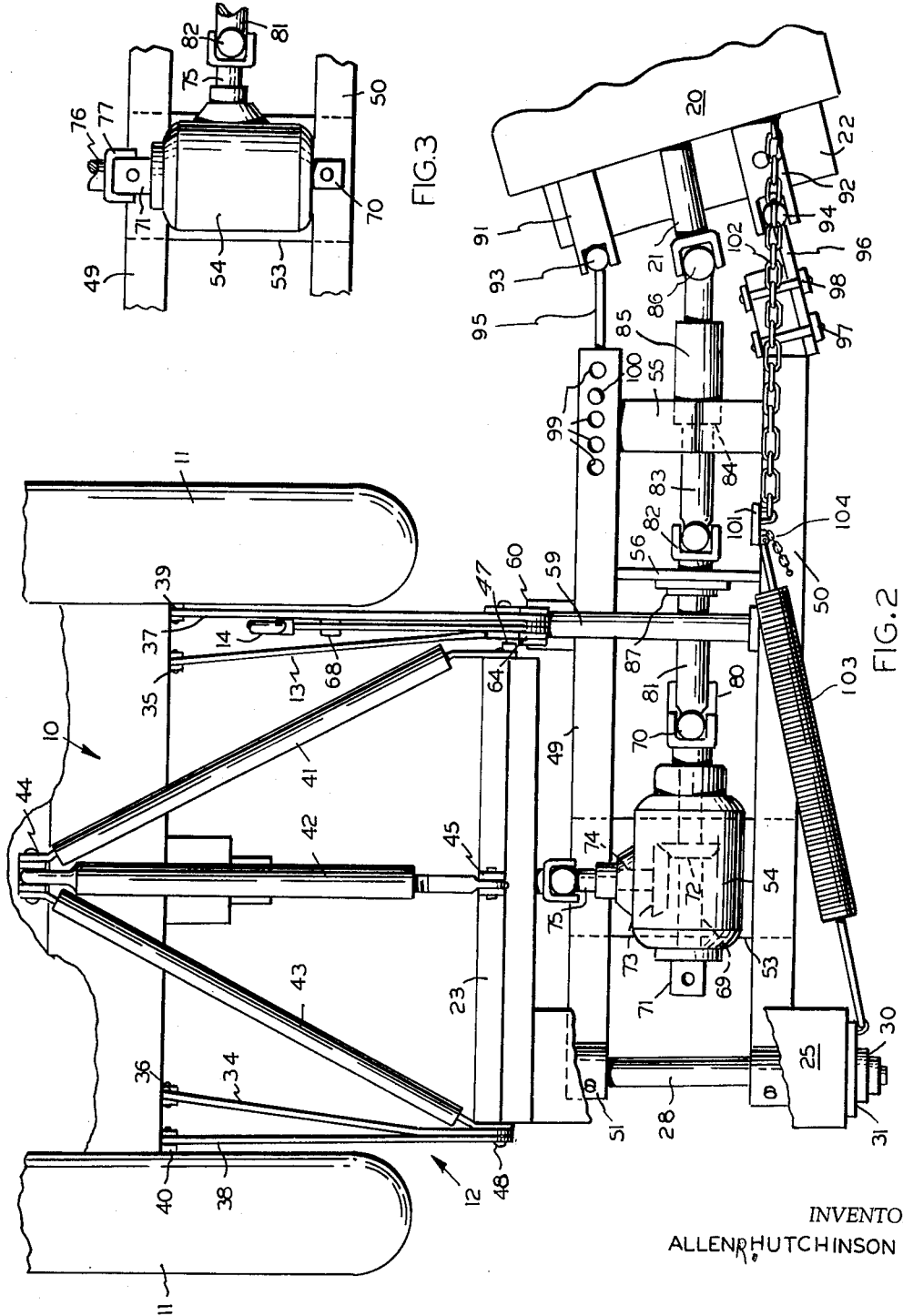

3,237,700
REAR-MOUNTED ROTARY HOE
Allen R. Hutchinson, 1216 W. Central, Orlando, Fla.
Filed Mar. 18, 1963, Ser. No. 265,814
4 Claims. (Cl. 172—47)

This invention relates to agricultural implements, and more particularly to an earth-tilling mechanism to be mounted at the rear end of a self-propelled vehicle or tractor which will follow the contour of the ground regardless of the irregularity of its surface.

A preferred form of the invention comprises an elongated cultivator of the type wherein a plurality of spacelike tools are mounted for rotation on a horizontally arranged shaft. A cultivator, or rotary hoe of this type is usually propelled over the ground in a direction generally at right angles to the axis of the rotating shaft, and is positioned to project laterally to one side of the line of travel of the propelling vehicle.

A rotary hoe of this type, in addition to being able to conform to the contour of the ground, should also preferably be adjusted so that its ground-engaging elements, which adjust the depth at which the rotating elements enter the soil, are maintained horizontal with respect to their direction of travel.

It is therefore an object of this invention to provide mounting means for implements of this type which is capable of adjustment about a horizontal axis normal to the direction of travel of the vehicle.

It is also an object of this invention to provide mounting means for a rotary hoe for attachment to agricultural tractors provided with a so-called "three point pitch."

Another object of the invention is to provide mounting means for rotary hoe cultivators capable of attachment to the rear end of an agricultural tractor having a power-actuated lifting arm, whereby the lifting arm may be utilized to raise the hoe mechanism above the ground to clear obstacles or to transport the implement from place to place.

A further object of the invention is to provide means to mount a laterally projecting rotary hoe mechanism at the rear end of a tractor having a power take-off means and to utilize the power take-off means for driving the hoe mechanism.

Still another object of the invention is to provide a supporting mechanism for mounting a laterally projecting rotary hoe mechanism at the rear end of a tractor having a power take-off shaft for driving the rotary hoe mechanism and to provide means whereby the direction of rotation of the rotary hoe may be quickly and easily reversed with respect to the direction of rotation of the take-off shaft.

Other objects of the invention will be apparent to those skilled in the art after reading the following specification in connection with the attached drawings, in which:

FIG. 1 is a perspective view of a preferred form of rear mounted rotary hoe constructed in accordance with the principles of this invention, portions of the supporting vehicle and implement being broken away;

FIG. 2 is a plan view of the same, also with portions of the vehicle and implement broken away; and FIG. 3 is a fragmentary plan view of the drive mechanism showing the arrangement for reversing the direction of rotation.

Turning now to the drawings in detail, there is shown in FIG. 1, a conventional agricultural tractor, indicated generally by the numeral 10, having a pair of ground-engaging wheels 11 supported by a frame structure, indicated generally by the numeral 12, including a generally horizontally extending pivotally mounted arm 13 connected with a power-actuated elevating lever 14, which is operated by a conventional mechanism (not shown) driven by the vehicle engine to raise and lower the arm 13 about its fixed pivot 15 under control of the operator of the tractor. The tractor is also provided with the usual rearwardly directed power take-off shaft 16.

The preferred form of rear-mounted hoe constructed in accordance with this invention comprises essentially a main frame, indicated generally by the numeral 17, for detachable mounting on the tractor structure 12, an intermediate frame, indicated generally by the numeral 18, and a sub-frame, indicated generally by the numeral 19, which includes a horizontally extending rotary hoe contained within a cover 20, only a portion of which is shown in the drawings. Rotary hoes of this type are well known in the art and the hoe, per se, forms no part of this invention.

Such hoes include a horizontally extending shaft 21 suitably journaled in the cover 20. This shaft is provided with a plurality of radially extending teeth (not shown) which dig into the soil when the shaft is rotated. When in operation, the shaft is maintained at a fixed distance from the ground by a pair of ground-engaging shoes suitably attached to the cover 20, only one of which is shown in the drawing, as indicated by the numeral 22.

The main frame 17 includes a horizontally extending transverse member 23 having at one end, a downwardly extending leg 24 and a horizontally rearwardly extending arm 25. At the forward end of arm 25, there is provided a downwardly extending transverse plate 26, while at the rearward end, there is another downwardly extending plate 27. A horizontally positioned mounting bar 28 extends between the two plates and is supported at one end on the plate 26 by means of a swivelling bearing 29 and at the other end by another swivelling bearing 30 mounted on an adjusting plate 31, this latter plate being secured to the plate 27 as by means of suitable bolts 32, which pass through the horizontally elongated slots 33 in the plate 27. Thus, it will be seen that the bar 28 may be adjustably positioned with respect to the arm 25 in a transverse horizontal direction about the bearing 29 in a direction indicated by the arrow A.

In the disclosure of the present invention, the implement is shown as being attached to a tractor having what is known as a "three point hitch," but it should be understood that by suitable modification, the implement can be attached to tractors of any description, including those having a fixed drawbar.

The conventional "three point hitch" includes a pair of transversely spaced horizontally rearwardly extending arms 13 and 34, having their forward ends connected respectively by swivelling pivot connections 35 and 36 to the framework of the tractor. In order to restrict movement of these arms in horizontal directions, but to permit free vertical movement, an additional pair of arms 37 and 38, of substantially the same length, are associated with each of the first two arms and have their forward ends also connected to the frame of the tractor by means of swivel pivots 39 and 40, respectively, and arranged in horizontal alignment with the swivel pivots 35 and 36.

The usual hitch of this type also includes three additional stabilizing arms 41, 42 and 43, all of which are connected at their forward ends to a common pivotal mounting 44 positioned centrally of the tractor frame and spaced vertically a substantial distance above the level of the pivots 35, 36, 39 and 40. Centrally positioned on the top of the transverse member 23, there is a pivotal connection 45 connected with an extension 46 of the arm 42 which is threadedly connected therewith. At the opposite ends of the member 23, there are provided a pair of horizontally outwardly projecting pins 47 and 48 disposed in horizontal alignment, but at a level substantially below that of the pivotal connection 45. The pin 47 extends through a suitable opening provided in the rear end of the stabilizing arm 41, while the pin 48 extends through suitable openings provided at the rear end, not only of stabilizing arm 43, but also through the rear ends of the arms 34 and 38.

The pivotal connections and the arrangement of the various arms 13, 37, 34, 38, 41, 42 and 43, are all more or less conventional elements of what is called the "three point hitch." Means such as cotter pins or the like are usually provided to detachably secure these connections and therefore it is believed unnecessary to describe them in further detail.

Furthermore, it will be obvious that by adjusting the length of the arm 42 by rotation of the extension 46, the transverse member 23 may be rocked backwardly and forwardly about a horizontal line extending through the pins 47 and 48, with the result that the bar 28 may be angularly adjusted in a vertical plane as indicated by the arrow B. Preferably, the arm 42 should be adjusted to position the bar 28 in a plane parallel with the ground.

The intermediate frame 18 comprises a pair of horizontally spaced transversely extending tubular members 49 and 50, which are connected at one end with the bar 28 by means of saddles 51 and 52, respectively. A supporting plate 53 for a right-angled drive means 54 is secured to the undersides of the members 49 and 50 at a location substantially in rearward alignment with the tractor power take-off 16. Additional reinforcement for the intermediate frame may be provided by the connecting strap 55 and vertically arranged supporting plate 56 positioned between the strap and the first-mentioned plate. The bar 28 may be somewhat longer than the distance between the tubular members of the intermediate frame to permit a certain amount of adjustment of the frame in a fore and aft direction, and once the adjustment has been made, the frame can be secured in this direction as by means of the set screws 57 and 58. However, since the bar 28 is free to revolve in the bearings 29 and 30, it will be evident that the free end of the frame may move in a vertical direction as indicated by the arrow at C.

The means whereby the intermediate frame may be raised or lowered includes a bar 59 extending in a generally fore and aft direction and attached above the tubular members by means of the upstanding straps 60 and 61 arranged at a point on the framework which is substantially rearwardly in alignment with the vertically movable arm 13 and elevating lever 14, which elements, together with the arm 37 constitute portions of the usual "three point hitch." The bar 59 receives a saddle element 62 which is slidable and rotatable thereon. Saddle 62 is joined to the ends of the arms 13 and 37 by a pair of short connecting links 63 and 64, these links having a universally pivotal connection 65 with the saddle and another universally pivotal connection 66 with the arms 13 and 37. In order to ensure that the radius of the arc of vertical movement of the pivot 65 coincides with the radius of the pivot 48, an additional link 67 is pivotally connected at one end with the pivot 65 and extends forwardly a short distance parallel with the arm 13 and is rigidly clamped thereto at its forward end by the clamping means 68.

The right-angled drive means 54 may include a shaft 69 extending throughout the length of the housing and provided with coupling means 70 and 71 at the opposite ends thereof projecting exteriorly of the housing. Fixed to this shaft within the housing, there is a bevel gear 72 arranged in operative engagement with another bevel gear 73 fixed to a stub shaft 74 and disposed at right angles to shaft 69 and terminating in a coupling 75 projecting exteriorly at one side of the housing. As shown in FIGS. 1 and 2, power from the power take-off 16 is supplied to the coupling 75 by means of a drive shaft 76 having a universal joint 77 connecting it with the coupling 75 at one end and at the other end having a splined connection at 78 with another universal joint 79 connecting it to the power take-off. The coupling 70 is connected by a universal joint 80 with a short shaft 81, the other end of this shaft being connected by a universal joint 82 to another shaft 83 which, in turn, has a splined connection at 84 with still a third shaft 85, which is connected by a universal joint 86 with the driven shaft 21 of the rotary hoe.

To permit articulation of shafts 83 and 85 with respect to shaft 81, this latter shaft is provided with a journal means 87, which journal is mounted on the vertical support plate 56, as by means of the bolts 88. Preferably, the support plate is provided with horizontally slotted apertures 89 and 90 for the bolts and a slotted opening is also provided through which the shaft 81 projects so as to permit the journal to be adjustably positioned in a horizontal direction between the frame members 49 and 50.

The sub-frame 19 for attaching the implement to the intermediate frame includes a pair of brackets 91 and 92 extending from one end of the implement in horizontally spaced arrangement. These brackets are provided with universally swivelling connections 93 and 94, respectively, with a pair of links 95 and 96. The link 96 is adjustably attached to the free end of the frame member 50 by means of a pair of clamps 97 and 98. The link 95 is slidably received within the interior of the frame member 49 and the free end of this member is provided with a series of vertically arranged spaced openings 99. The inner end of link 95 is somewhat enlarged and provided with a vertical opening for alignment with one of the openings 99 and may thus be held in a plurality of positions by means of the pin 100.

This arrangement, which permits the hoe to be adjustably positioned with respect to the tractor in a horizontal plane is described and claimed in the co-pending application of Allen R. Hutchinson and William Hutchinson, Serial No. 73,142, filed December 1, 1960, now Patent No. 3,127,940, and forms no part of this invention.

Ordinarily, the usual angles of adjustment can be obtained by shifting of the link 95, but for additional angularity, the link 96 can also be changed by releasing the clamps 97 and 98; these clamps being tightened when the proper angle has been reached.

In order to reduce the weight of the outer end not (not shown) of the implement upon the ground, a biasing means is provided as is the usual practice. This arrangement may include an upwardly projecting lever 101 pivotally connected at its lower end to the frame member 50, and having a chain 102 connected between the upper end of the lever and an upper portion of the implement cover 20. A coil spring 103 is also connected between the lever 101 and a portion of the main frame such as the plate 31 so that the tension exerted by this spring when the implement is extended is insufficient to raise the implement from the ground, but will reduce the weight a sufficient amount so as not to produce an undue drag. However, for transport when the implement is not in use, an additional chain 104 is connected between the lever and intermediate frame to lift the implement after the frame has been raised beyond a certain level.

A feature of the invention which permits the rotary shaft of the hoe to be driven in either direction is illustrated by reference to FIG. 3. With the right angle drive means 54 connected as shown in FIGS. 1 and 2, it will be seen that if the shaft 76 is driven in a counterclockwise direction as viewed from the rear end of the tractor, then the shaft 21 of the implement will be driven in a clockwise direction as viewed from the left-hand side of the tractor. That is to say, that if the tractor is moving forward, then the individual cultivator elements attached to shaft 21 will move forwardly as they dig into the soil. It will also be observed that since the gear 72 is smaller than gear 73, the shaft 21 will rotate at somewhat greater speed than the shaft 76.

However, for certain types of cultivating, it is desirable to reverse the direction of the elements of the cultivator. With the present invention, this may be easily accomplished by shifting the drive means 54 at 90° in an angular direction with respect to a vertical line, as shown in FIG.

3. Various ways of accomplishing this change in position will occur to those skilled in the art, but in the present instance, by way of example only, the housing 54 is attached to the supporting plate 53 by means of four equilaterally spaced bolts (not shown), so that when the couplings between the shafts 76 and 81 and the drive mechanism are disconnected, it is easy to detach the housing from the supporting plate and to re-attach it to the support in either of the positions alternatively shown in the drawings.

If, therefore, the drive mechanism is arranged as shown in FIG. 3, the shaft 76 will drive shaft 69 through the coupling 71 and the output of the drive mechanism 54 will be through coupling 75, universal joint 80 and shaft 81. With the arrangement shown in FIG. 3, and with the shaft 76 turning in a counterclockwise direction, as before, it will be evident that shaft 21 will also be driven in a counterclockwise direction as viewed from the left side of the tractor and also at a somewhat slower speed than that of shaft 76. This means that the cultivator elements on shaft 21 will tend to dig backwardly to the soil as the tractor moves forward; the exact relationship between the movement of these elements and the soil being determined by the ratio between gears 72 and 73. Obviously, other gear ratios may be provided by proper choice of gears 72 and 73.

Having disclosed one form in which the invention may be practiced, it will be evident to those skilled in the art that various modifications and improvements may be made which would come within the scope of the annexed claims.

I claim:

1. In agricultural equipment of the character wherein an elongated implement means is detachably secured to the rear end of a tractor to extend laterally thereof, said tractor having a three-point hitch and a power-operated arm pivoted at one end for vertical movement, the combination including, main frame means, intermediate frame means, and subframe means, the main frame means having means for rigid attachment to the three-point hitch of a tractor, the intermediate frame means being elongated, means for pivotally connecting one end of said frame means with the main frame means at one side of a tractor for movement in a vertical transverse plane, said connecting means including longitudinally slidable adjusting means for longitudinally positioning said intermediate frame means, said connecting means also including angular adjusting means for positioning said slidable adjusting means about a vertical axis, said intermediate frame means having connecting means disposed medially of its length for operative attachment with the power-operated arm of a tractor for raising and lowering the frame means, the subframe means being elongated and having one end pivotally connected with the free end of the intermediate frame means for movement in a vertical substantially transverse plane and having a longitudinal cultivator shaft rotatably mounted thereon, and articulated drive means for operative engagement with a tractor power take-off for driving said shaft.

2. The invention as defined in claim 1, wherein said pivotal connection for the intermediate frame means includes a shaft mounted on the main frame means, said intermediate frame means including an element slidably adjustably fixed on said shaft.

3. The invention as defined in claim 1, wherein said drive means includes transmission means includes a rotatably journalled shaft having a coupling means at each end thereof and a rotatably journalled stub shaft having a coupling means at one end thereof, each of said shafts having a gear fixed thereon and said gears being arranged in intermeshing engagement with each other.

4. The invention as defined in claim 3, wherein the axes of said shafts are angularly related, and said gears are of unequal size for providing different ratios for driving the driven shaft.

References Cited by the Examiner

UNITED STATES PATENTS

| 2,176,261 | 10/1939 | Kelsey | 172—117 X |
| 2,568,931 | 9/1951 | Paul | 56—25 |
| 2,748,679 | 6/1956 | Rogers | 172—98 |
| 2,974,469 | 3/1961 | Smith et al. | 172—79 |
| 2,974,735 | 3/1961 | Smith et al. | 172—79 X |
| 3,028,919 | 4/1962 | Smith et al. | 172—119 X |
| 3,074,285 | 1/1963 | Hausmann | 74—325 |
| 3,092,053 | 6/1963 | Kirkpatrick | 172—79 |

FOREIGN PATENTS 228,692   6/1960   Australia.

ABRAHAM G. STONE, *Primary Examiner.*

SAMUEL KOREN, *Examiner.*